(12) United States Patent
Mantyla

(10) Patent No.: US 6,902,030 B2
(45) Date of Patent: Jun. 7, 2005

(54) SOUND MUFFLING APPARATUS FOR AIR OPERATED EQUIPMENT

(76) Inventor: Vilho O. Mantyla, 415 St. Helen's Point Road, Sudbury, Ontario (CA), P3E 6E6

( * ) Notice: Subject to any disclaimer, the term of this patent is extended or adjusted under 35 U.S.C. 154(b) by 37 days.

(21) Appl. No.: 10/447,622

(22) Filed: May 29, 2003

(65) Prior Publication Data

US 2004/0238274 A1 Dec. 2, 2004

(30) Foreign Application Priority Data

Apr. 30, 2003 (CA) .............................................. 2427306

(51) Int. Cl.⁷ ................................................ F01N 1/08
(52) U.S. Cl. ........................ 181/270; 181/264; 181/258; 181/247; 181/271
(58) Field of Search ................................ 181/270, 264, 181/258, 247, 271

(56) References Cited

U.S. PATENT DOCUMENTS

| | | | |
|---|---|---|---|
| 3,187,837 A | 6/1965 | Beeching | |
| 3,559,760 A | 2/1971 | Ninomiya | |
| 3,635,125 A | 1/1972 | Rosen et al. | |
| 3,680,659 A | * 8/1972 | Kasten | ........................ 181/230 |
| 3,811,251 A | 5/1974 | Gibel | |
| 3,858,666 A | 1/1975 | Bailey et al. | |
| 3,958,597 A | 5/1976 | Meyer et al. | |
| 4,010,819 A | 3/1977 | Ekström et al. | |
| 4,033,428 A | 7/1977 | Wennerstrom | |
| 4,079,809 A | 3/1978 | Visnapuu et al. | |
| 4,299,305 A | 11/1981 | Eriksson | |
| 4,407,390 A | 10/1983 | Le Blanc, Jr. | |
| 6,196,331 B1 | 3/2001 | Naito et al. | |
| 6,209,678 B1 | 4/2001 | Sterling | |

* cited by examiner

Primary Examiner—Shih-Yung Hsieh
(74) Attorney, Agent, or Firm—The Webb Law Firm, P.C.

(57) ABSTRACT

A muffler for equipment powered by compressed air, the muffler comprising a flexible muffler body formed from a sufficiently resilient material to resiliently deform under the influence of an exhaust air stream from an air motor, the body having an inlet and an outlet; a plurality of flexible baffles located within said body to muffle the sound of the air powered equipment; and an oil mist remover extending at least partially through said body, said oil mist remover being sized and shaped to prevent trapped oil from being re-misted by said exhaust air stream.

19 Claims, 5 Drawing Sheets

SOUND MUFFLING APPARATUS FOR AIR OPERATED EQUIPMENT

FIELD OF THE INVENTION

This invention relates to the field of air-powered equipment, and in particular, to the field of safety-related accessories for air-powered equipment.

BACKGROUND OF THE INVENTION

In many different situations, compressed or pressurized air is used to power various different types of equipment. For example, in mines, air-powered rock drills, tugger hoists, shaft muckers, chute gates and vent doors are commonly used. Air-powered equipment is also used in other locations, such as manufacturing facilities and repair garages. Air power is used because it is a convenient and efficient method of powering tools in locations where other forms of power might be more awkward, or simply unavailable.

Air-powered equipment usually includes motors or other configurations containing mechanical parts, pistons, bores and the like which move relative to one another. Unless lubricated, such moving components will suffer wear as a result of rubbing against one another. Thus, typically, the manufacturers of air-powered equipment include a lubricating spray in the air stream upstream of the equipment. This creates an oil mist or fog which is carried by the air stream into the equipment to lubricate the various moving components.

As the air stream moves through the equipment and is exhausted, it carries the oil mist out of the air-powered equipment, through the exhaust, and into the air space to which the air exhaust vents. Equipment operators and other persons located in this air space are adversely affected by the oil mist that is present in the air that they are breathing.

In addition, air powered equipment can be quite noisy. The volume of the noise increases as the size of the motor increases. For example, in mining applications, jumbo rock drills are used. These drills are often so noisy that exposure to the noise is very uncomfortable, and prolonged exposure to such noise can adversely affect the hearing of people exposed.

In the past, muffler devices have been designed for the purpose of reducing or silencing the noise being emitted by air powered equipment. However, such devices have typically been found to be inadequate. Specifically, the process of venting compressed air through the exhaust tends to cause water vapour in the compressed air to freeze and form ice crystals inside the sound muffling device. As a result, ice tends to accumulate on the inside of the muffling device fairly quickly, gradually blocking air flow, thus rendering both the muffling device and the air-powered equipment ineffective.

U.S. Pat. No. 4,079,809 issued Mar. 21, 1978 to Visnapuu discloses an air motor muffler comprising a rigid muffler body and flexible baffles therein, the baffles being composed of neoprene or similar material. The baffles are arranged in series, and alternate between having edge holes and center holes which allow air to pass through the baffle, thus muffling the noise from the motor. The baffles are flexible, so that when the compressed air is vented through the muffler, the baffles vibrate, dislodging any ice crystals from the baffles and preventing the accumulation of ice. The air being exhausted then travels through a narrowed nozzle to the atmosphere.

The device of Visnapuu suffers from a number of defects. First, though the baffles are resistant to ice accumulation, ice may still accumulate on the body of the Visnapuu device in sufficient amounts to reduce or completely block airflow through the device. Second, the outlet of the Visnapuu device is substantially smaller than the inlet. Such a configuration tends to amplify the sound of passing compressed air pulses, producing white noise. Thus, the Visnapuu device may actually create noise as air passes through the muffler. Finally, the Visnapuu device allows oil mist to be discharged into the air, which can negatively affect personnel present near the device.

U.S. Pat. No. 4,299,305 issued Nov. 10, 1981 to Eriksson teaches an exhaust air muffler for silencing sound from air or gas outlets. The muffler comprises an outer tube or flexible hose which contains an inner sound absorbing body. The sound absorbing body may be composed of various types of flexible materials, such as foam plastic surrounded by a stocking, a body of spun or pleated thread, a large number of thin longitudinal threads or a large number of inwardly directed bundles of fibers. In the Eriksson device, both the outer tube and inner sound absorbing body may be flexible, so as to be deform when impacted by the compressed air being exhausted so as to prevent the formation of ice in the muffler.

In addition, Eriksson teaches that oil mist will tend to condense on the inner surface of the outer tube, and on the surface of the inner sound absorbing body. According to Eriksson, the condensed droplets eventually form into larger drops and are transported by the airflow within the muffler toward the outlet end of the muffler, where they drip out of the muffler, without being expelled into the air as a mist and creating a breathing hazard.

However, the muffler of Eriksson may not effectively prevent oil mist from being exhausted into the surrounding air. Specifically, while oil droplets may condense on the inner surfaces of the muffler, the droplets will tend to be re-misted each time air under pressure is vented through the muffler. This remisted oil is then vented through the muffler into the air. Therefore, the Eriksson device is inadequate for preventing oil mist from being released into the air.

SUMMARY OF THE INVENTION

Therefore, what is desired is a muffler for equipment powered by compressed air, wherein the muffler effectively reduces the noise made by the venting of such compressed air to adequately low levels. Because the venting of the compressed air through a muffler tends to cause an airflow-blocking accumulation of ice within the muffler, the muffler should be structured so as to prevent such an accumulation of ice. Finally, the muffler should be effective to eliminate or substantially reduce the venting of oil mist from the muffler to the surrounding air.

Therefore, according to the present invention, there is provided a muffler for equipment powered by compressed air, said muffler comprising:

a flexible muffler body formed from a sufficiently resilient material to resiliently deform under the influence of an exhaust air stream from the body having and inlet and an outlet;

a plurality of flexible baffles located within said body to muffle the sound of the equipment; and an oil mist remover extending at least partially through said body, said oil mist remover being sized and shaped to prevent trapped oil from being re-misted by said exhaust air stream.

BRIEF DESCRIPTION OF THE DRAWINGS

Reference will now be made to drawings which depict, by way of example only, preferred embodiments of the invention, and in which.

DETAILED DESCRIPTION OF THE PREFERRED EMBODIMENTS

Figure 1:
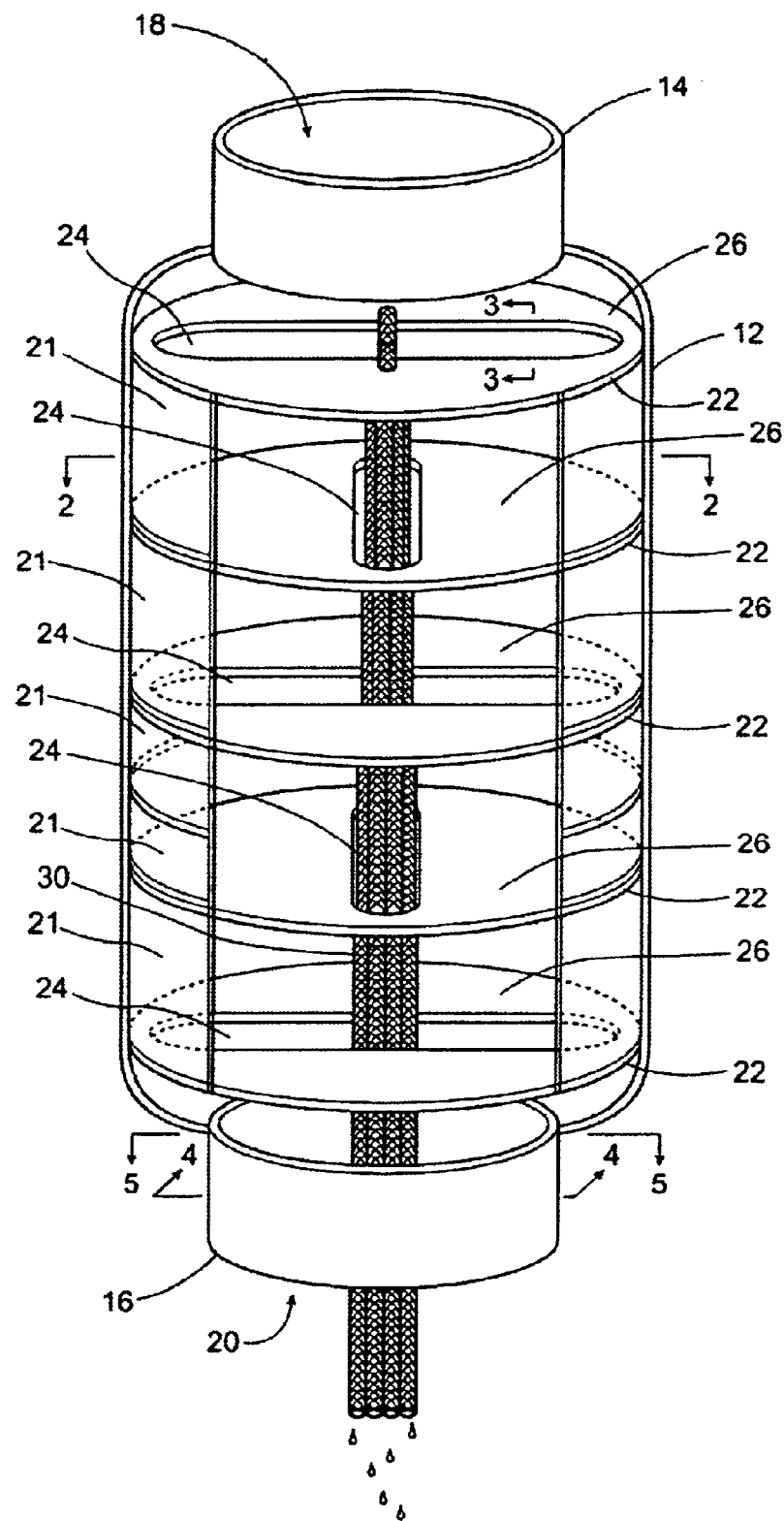
FIG. 1 is a perspective view of the muffler of the present invention in which the tubular portions and outer shell are partially cut away.

Referring now to FIG. 1, the muffler for equipment powered by compressed air, generally designated by reference numeral 10, is shown. The muffler 10 includes a flexible muffler body, preferably in the form of a tubular outer shell 12. Preferably, the muffler 10 and its tubular outer shell 12 are located on a generally vertical axis. The shell 12 further includes a flexible inlet end 14 at inlet 18 located at the top end of the tubular outer shell 12 and a flexible outlet end 16 at the outlet 20 located at bottom side of the tubular outer shell 12.

The muffler 10 further includes a rigid inlet adaptor fitting 15 (shown at FIGS. 6 and 7) sized and shaped to be connectable to an exhaust hose (not shown) from air-powered equipment at the hose-receiving element 17, preferably by a band clamp or the like. The inlet adaptor 15 is also preferably sized and shaped to be securable with a band clamp to the muffler 10, by being accepted inside the inlet 18 and the inlet end 14.

Figure 6:
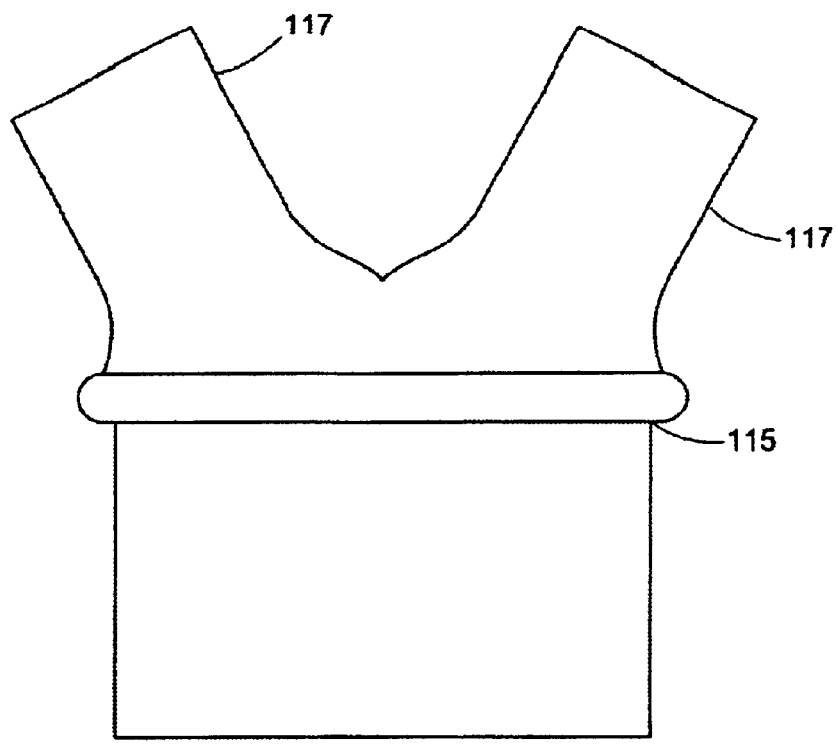
FIG. 6 is an elevation view of a two-input inlet adaptor according to the present invention.
Figure 7:
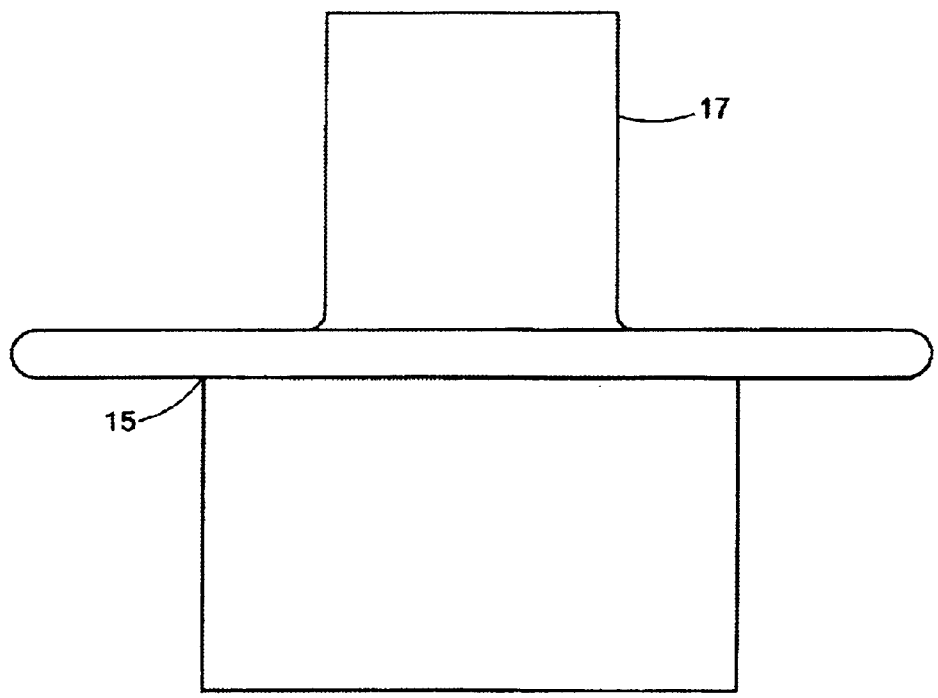
FIG. 7 is an elevation view of a one-input inlet adaptor according to the present invention.

FIG. 6 shows an alternate, two-input version of the inlet adaptor having two exhaust hose receiving elements 117. The two-input inlet adaptor 115 is configured to attach to two exhaust hoses simultaneously, permitting the muffler 10 to muffle sound from air powered equipment having two exhaust ports.

Also, preferably, the muffler 10 includes a rigid outlet adaptor fitting 19 (shown in FIG. 4) which is sized and shaped to be securable with a band clamp to the muffler 10 by being accepted inside the outlet 20 and the outlet end 16.

Preferably, the inlet 18 is smaller than the outlet 20, such that more air can flow through the outlet 20 than the inlet 18. It is believed that this configuration prevents amplification of the noise made by the air being exhausted.

Figure 2:
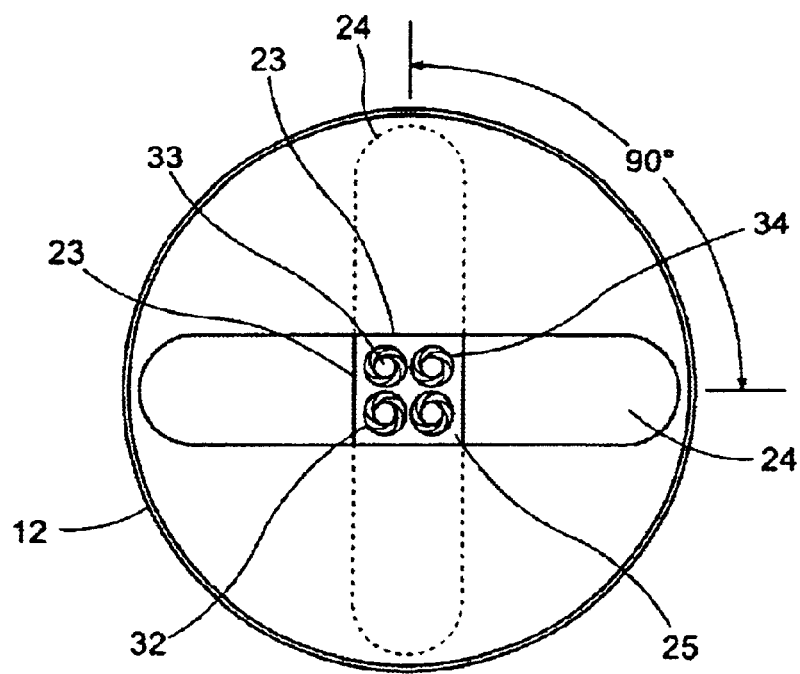
FIG. 2 is a cross-sectional view of the muffler taken along section line 2—2 of FIG. 1.

The muffler 10 further includes five flexible baffles 22 to muffle the sound of air powered equipment. Each baffle 22 comprises a tubular portion 21 and a baffle-forming portion 26. Preferably, the baffle-forming portion 26 takes the form of a flexible member extending across the tubular shell 12. The tubular portion 21 is preferably cylindrical in shape, with one of its ends being attached to the perimeter of the baffle-forming portion 26. Each baffle-forming portion 26 has an opening 24 therein. Preferably, the openings 24 are oblong-shaped openings which include axially aligned portions 23 defining an open passageway 25 through the baffle-forming portions 26. Also, preferably, each opening 24 is oriented at a ninety degree angle to the opening 24 in the baffle above (see FIG. 2). Thus, in the preferred embodiment, the axially aligned portions 23 are central portions of the openings 24.

It will be appreciated that the invention comprehends different numbers and types of baffles from the preferred configuration described above. What is important is that the muffler include a plurality of flexible baffles to muffle sound from air powered equipment.

It can now be appreciated how the muffler 10 operates to muffle the sound from an air powered or air operated equipment. The air stream enters from an exhaust hose (not shown) is coupled to the inlet 18, through the inlet 18 and into the tubular outer shell 12. The tubular outer shell 12 is formed from a material sufficiently resilient so that it resiliently deforms under the influence of an exhaust airstream coming from the air-powered equipment and entering the shell 12 through the inlet 18. The shell 12 is sufficiently resilient so as to deform enough to prevent the buildup of ice on the shell 12. Preferably, the shell 12 will be composed of rubber or eurathane. Rubber-like materials such as flexible PVC and plastisol are also adequate for this purpose.

After entering the tubular outer shell 12, the air contracts the baffle-forming portions 26, and is forced through the openings 24 thereof. The openings 24 are preferably oblong in shape, and each is preferably oriented at an angle displaced 90 from the adjacent openings 24. As a result, when air travels through the top opening 24, it will then exert pressure on the second baffle-forming portion 26 because the oblong second opening 24 is angularly displaced from the first opening 24. This causes the second baffle-forming portion 26 to flex or resiliently deform. The air is forced through the second opening 24 and the process repeats for each baffle-forming portion 26. Air flows through the openings 24, and each baffle-forming segment 26 flexes in response to pressure from the air stream. This flexing or deforming of the baffles 22 prevents the buildup of ice crystals on the baffles 22. The shell 12 also deforms in response to the pressure of the exhaust air stream, thus preventing the buildup of ice crystals thereon.

Preferably, the baffles 22 are composed of rubber. Rubber-like materials such as eurathane, flexible PVC and plastisol are also adequate. What is important is that the baffles 22 preferably be flexible enough to deform sufficiently in response to the air stream to prevent the buildup of ice on the baffles.

It will be appreciated that the flexible baffles 22 and the shell 12 will absorb a substantial amount of the kinetic/vibratory energy from the air being exhausted, thus muffling the sound. This reduction in noise in turn provides comfort and protection for persons located near air-powered equipment. Preferably, the tubular portions 21 will be of varying lengths which, it is believed, will improve the sound muffling of the muffler 10.

It will be appreciated that the tubular portions 21 of the preferred muffler function to support the baffle-forming portions 26 within the shell 12 and space the portions 26 apart from one another. As can be seen in FIG. 1, in the preferred embodiment, the tubular portions 21 associated with the bottom two baffles extend upward from the baffle forming portions 26. The other tubular portions 21 extend downward. The baffles 22 are thus spaced and supported within the shell 12. It will be appreciated that the invention comprehends other baffle configurations. What is important is that the muffler 10 includes a plurality of flexible baffles located within the muffler body to muffle the sound of the air powered equipment.

The muffler 10 further includes an oil mist remover 30 extending at least partly through the shell 12. As will be more particularly described below, the oil mist remover 30 is sized and shaped to prevent trapped oil from being re-misted by the exhaust air stream.

Figure 3:
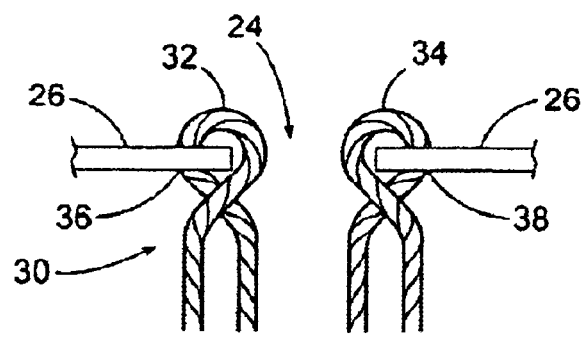
FIG. 3 is a cross-sectional view taken along section line 3—3 of FIG. 1.

Preferably, the oil mist remover 30 comprises one or more, and most preferably, two braided strands 32, 34, each of the braided strands 32, 34 being composed of a fibrous material to which airborne oil droplets tend to attach themselves. The preferred fibrous material is polypropylene or nylon, though other materials may also be used. The strands 32, 34 preferably each have a hollow center 33, and each is preferably configured to permit droplets of oil, which attach to the braided strands 32, 34, to migrate to the hollow center 33 thereof. As shown in FIGS. 1 and 3, the strands 32, 34 are preferably attached to one of the baffles 22 and in particular, the top baffle. Most preferably, the strands 32, 34 are each threaded through a hole (36, 38) in the top baffle 22. The holes 36, 38 are preferably positioned adjacent the top opening 24. The strands 32, 34 are suspended on the portion of the baffle 22 between the hole (36 or 38) and the opening 24. Thus, one side of each strand (32 or 34) extends down through the hole (36 or 38) and through the open passageway 25 formed by the openings 24. The other side of each strand (32 or 34) extends down through the top opening 24 and down through the open passageway 25 formed by the openings 24 in the baffles 22.

Preferably, both ends of each strand 32,34 extend past the outlet 20, and, most preferably, past the outlet adaptor 19.

It can now be appreciated how the oil mist remover 30 operates. The air exhaust stream containing oil mist enters the muffler 10. The air travels through the openings 24, and, in particular, through the open passageway 25. The oil mist remover 30 extends through the open passageway 25, and the airborne oil droplets of the mist attach themselves to the fibrous material of the strands 32, 34. Then, the oil droplets migrate to the hollow centers 33 of the strands 32, 34, preferably between the braids of the strands 32, 34.

It will be appreciated that, by being configured to permit the droplets to migrate to the hollow centers 33 of the strands 32, 34, the strands 32, 34 prevent the trapped oil droplets from being re-misted by the exhaust air stream. This is because, once the migration of the droplets to the hollow centers 33 of the strands 32, 34 takes place, the fibrous material of the strands 32, 34 shields these droplets from the exhaust air stream and prevents them from being re-misted.

It will also be appreciated that, because the strands 32, 34 are attached to a baffle 22, the strands 32, 34 will be vibrated axially by the baffle 22 when the baffle 22 is vibrated by the incoming exhaust air stream. This vibration of the strands 32, 34 promotes the coalescence of oil droplets, trapped in the hollow centers 33, into drops, and the shedding of these oil drops down the hollow centers 33 of the strands 32, 34. Because the strands 32, 34 extend past the outlet 20, the oil drops will then drip out of the shell 12 and the muffler 10, rather than remaining in the shell 12 and getting remisted by the air stream.

It will also be appreciated that the invention comprehends different configurations of the oil mist remover 30 besides the preferred structure described above. For example, there may be only one strand, or more than two. Or, the oil mist remover may have a different configuration than the suspended braided strand configuration described above. What is important is that the oil mist remover 30 extend partially through the muffler body and be sized and shaped to prevent trapped oil from being remisted by the exhaust air steam.

Figure 4:
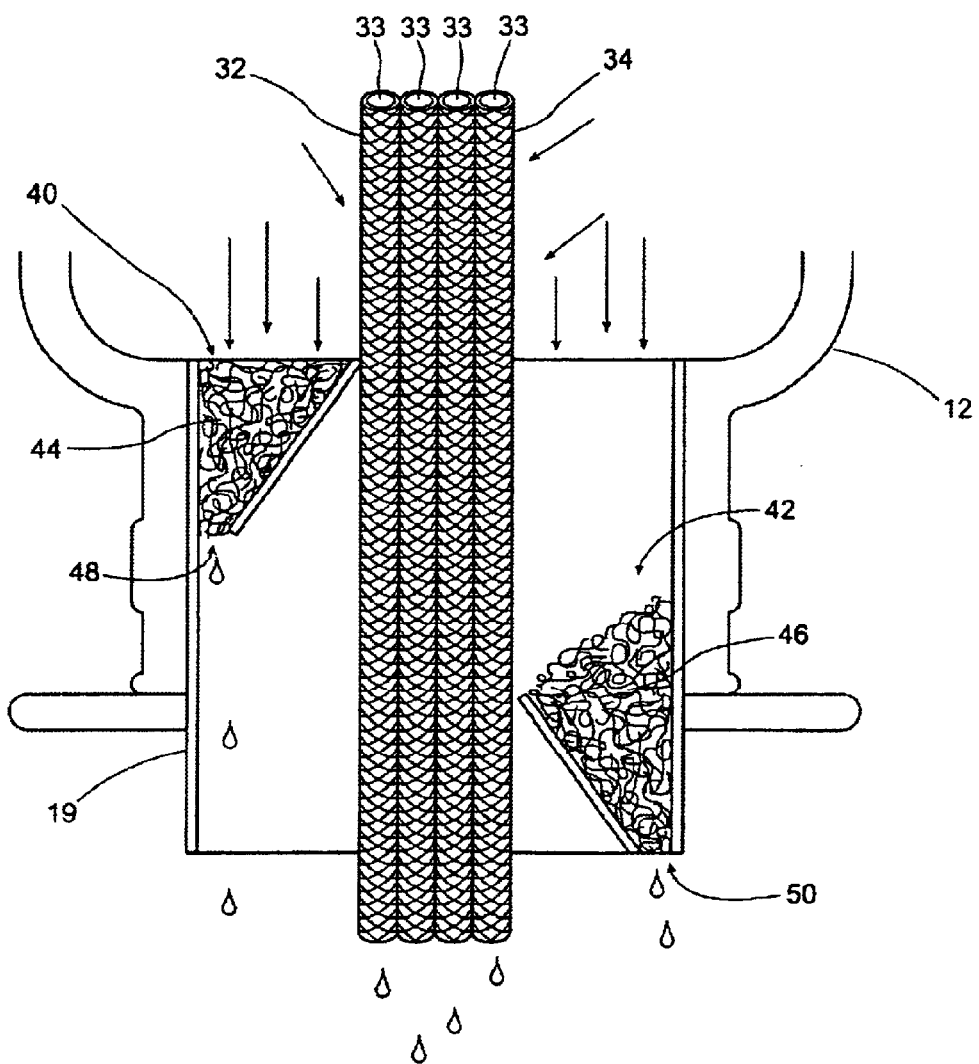
FIG. 4 is a cross-sectional view taken along section line 4—4 of FIG. 1.
Figure 5:
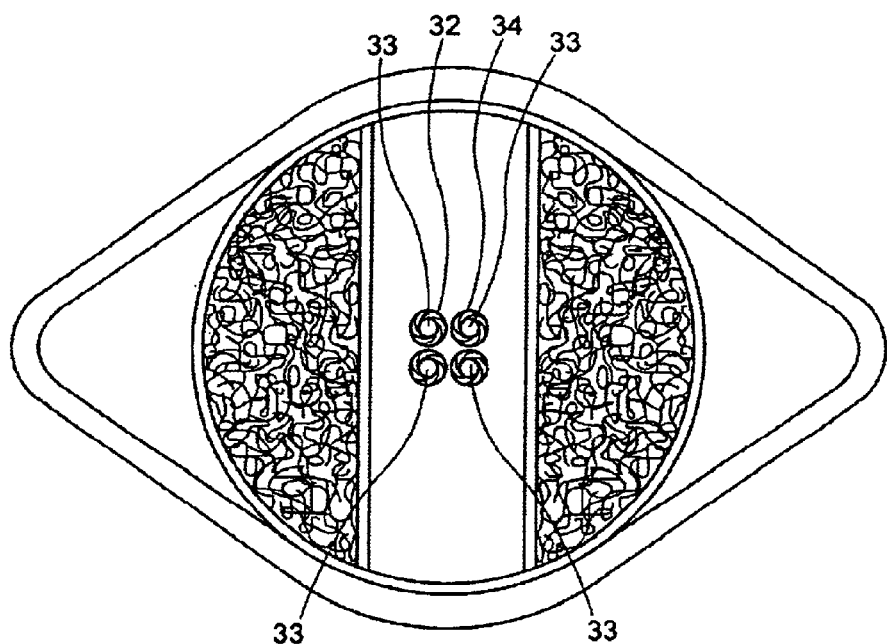
FIG. 5 is a cross-sectional view taken along section line 5—5 of FIG. 1.

Referring now to FIGS. 4–5, the muffler 10 preferably further includes an oil trap comprising two chambers 40,42 axially aligned with the bottom baffle opening 24, so that the exhaust air stream enters the chambers 40,42. The chambers 40,42 are preferably located adjacent the outlet 20. Most preferably, the chambers 40,42 each carry a secondary oil demister 44,46 in the form of a coarse wool-like material. The preferred wool like material is copper gauze, though stainless steel gauze, plastic gauze or other wool like materials may be used. The air stream is directed through the secondary oil demisters 44,46, and remaining oil mist being carried in the stream will attach itself to the wool-like material. The oil caught in the wool-like material then drips out of the muffler 10 through openings 48,50 at the bottom of the chambers 40,42. Meanwhile, the air stream proceeds through the outlet 20 to the atmosphere.

It will be appreciated that the oil trap need not comprise two chambers 40,42 as described above. Other configurations for the oil trap are comprehended by the invention. What is important is that the oil trap preferably include at least one chamber, axially aligned, which directs the air stream past a secondary oil demister.

Various modifications and alterations are possible to the form of the invention without departing from the scope of the broad claims attached thereto. For example, the baffles may have a different configuration than the preferred one described above. The openings 24 may have different shapes or positions and still be comprehended by the invention. The strands 32, 34 could be porous, with oil migrating to their centers through the pores. What is important is that the muffler 10 include a flexible muffler body, a plurality of flexible baffles for muffling sound, and an oil mist remover that prevents trapped oil from being remisted.

The embodiment of the invention in which an exclusive property or privilege is claimed are defined as follows:

1. A muffler for equipment powered by compressed air, said muffler comprising:
   a flexible muffler body formed from a sufficiently resilient material to resiliently deform under the influence of an exhaust air stream, the body having an inlet and an outlet;
   a plurality of flexible baffles located within said body to muffle the sound of the equipment; and
   an oil mist remover extending at least partially through said body, said oil mist remover being sized and shaped to prevent trapped oil from being re-misted by said exhaust air stream,
   wherein said muffler is located on a generally vertical axis with said inlet on a top end and said outlet on a bottom end wherein said oil mist remover extends through said axially aligned portions of said baffle openings.

2. A muffler for equipment powered by compressed air as claimed in claim 1 wherein said baffles comprise flexible members extending across said muffler body, each of said baffles having an opening formed therein.

3. A muffler for equipment powered by compressed air as claimed in claim 2 wherein said openings include axially aligned portions to define an open passageway through said baffles.

4. A muffler for equipment powered by compressed air as claimed in claim 1 wherein said oil mist remover is in the form of a fibrous material to which airborne droplets of oil will attach.

5. A muffler for equipment powered by compressed air as claimed in claim 4 wherein said fibrous material is in the form of one or more braided strands having a hollow center.

6. A muffler for equipment powered by compressed air as claimed in claim 5 wherein each of said braided strands is configured to permit said droplets of oil which attach to said braided strand to migrate to said hollow center.

7. A muffler for equipment powered by compressed air as claimed in claim 6 wherein said braided strand is vibrated in use to promote the shedding of oil down said hollow center.

8. A muffler for equipment powered by compressed air as claimed in claim 7 wherein said braided strand is attached to one of said flexible baffles and as said baffle vibrates during use said braided strand is also vibrated.

9. A muffler for equipment powered by compressed air as claimed in claim 7 wherein said muffler includes an inlet opening and an outlet opening and said braided strand extends past said outlet opening to permit said oil to drip out of said body.

10. A muffler for equipment powered by compressed air as claimed in claim 1 wherein the body comprises a tubular outer shell and wherein each of said baffles comprises a tubular portion and a baffle-forming portion.

11. A muffler for equipment powered by compressed air as claimed in claim 10 wherein said tubular portions are of varying lengths to improve the sound muffling.

12. A muffler for equipment powered by compressed air as claimed in claim 10 wherein said baffle-forming portion comprises a flexible member extending across said shell, said flexible member having an opening formed therein.

13. A muffler for equipment powered by compressed air as claimed in claim 1 further including an adapter for said inlet, to permit said inlet to be connected to one or more exhaust hoses.

14. A muffler for equipment powered by compressed air comprising:

- a flexible muffler body formed from a sufficiently resilient material to resiliently deform under the influence of an exhaust air stream, the body having an inlet and an outlet;
- a plurality of flexible baffles located within said body to muffle the sound of the equipment;
- an oil mist remover extending at least partially through said body, said oil mist remover being sized and shaped to prevent trapped oil from being re-misted by said exhaust air stream; and
- an oil trap located adjacent said outlet, said oil trap comprising at least one axially aligned chamber which directs exhaust air past a secondary oil demister.

15. A muffler for equipment powered by compressed air as claimed in claim 1 further including ends which are sized and shaped to accept either of said inlet and outlet.

16. A muffler for equipment powered by compressed air as claimed in claim 14 wherein said baffles comprise flexible members extending across said muffler body, each of said baffles having an opening formed therein.

17. A muffler for equipment powered by compressed air as claimed in claim 16 wherein said openings include axially aligned portions to define an open passageway through said baffles.

18. A muffler for equipment powered by compressed air as claimed in claim 14 wherein said oil mist remover is in the form of a fibrous material to which airborne droplets of oil will attach.

19. A muffler for equipment powered by compressed air as claimed in claim 14 wherein said muffler is located on a generally vertical axis with said inlet on a top end and said outlet on a bottom end wherein said oil mist remover extends through said axially aligned portions of said baffle openings.

\* \* \* \* \*